United States Patent
Moger, IV

(10) Patent No.: US 10,598,197 B2
(45) Date of Patent: Mar. 24, 2020

(54) PARTICULATE LADEN FLUID VORTEX EROSION MITIGATION

(71) Applicant: HALLIBURTON ENERGY SERVICES, INC., Houston, TX (US)

(72) Inventor: Robert Cecil Moger, IV, Duncan, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 123 days.

(21) Appl. No.: 15/579,515

(22) PCT Filed: Jul. 16, 2015

(86) PCT No.: PCT/US2015/040778
§ 371 (c)(1),
(2) Date: Dec. 4, 2017

(87) PCT Pub. No.: WO2017/011019
PCT Pub. Date: Jan. 19, 2017

(65) Prior Publication Data
US 2018/0149177 A1    May 31, 2018

(51) Int. Cl.
*E21B 17/10* (2006.01)
*E21B 43/26* (2006.01)
(Continued)

(52) U.S. Cl.
CPC ............... *F15D 1/06* (2013.01); *F15D 1/02* (2013.01); *F15D 1/025* (2013.01); *F16L 57/06* (2013.01)

(58) Field of Classification Search
CPC .. E21B 17/10; E21B 17/1007; E21B 17/1085; E21B 2033/005; E21B 43/26;
(Continued)

(56) References Cited

U.S. PATENT DOCUMENTS 1,683,089 A * 9/1928 Mills .................. F02M 1/00
138/37
1,689,446 A * 10/1928 Miller ................ F02M 1/00
138/37
(Continued)

FOREIGN PATENT DOCUMENTS

WO        7900785 A1    10/1979

OTHER PUBLICATIONS

Halliburton Wellhead Connection Unit, Stimulation, Fracturing Equipment, H10405, Jul. 2013, 3 pages, Halliburton, Houston, TX.
(Continued)

*Primary Examiner* — Matthew R Buck
(74) *Attorney, Agent, or Firm* — Polsineli PC

(57) ABSTRACT

A vortex suppression element is configured to be inserted in a pipe joint between pipe segments for mitigation of erosion from particulate laden fluid flowing in at least one of the pipe segments. The vortex suppression element includes an outer ring, and an array of inner axial vanes secured to the outer ring. A method of using the vortex suppression element includes locating, in the pipeline, a pipe joint at a location where a vortex would form in the particulate laden fluid flowing in the pipeline in the absence of a vortex suppression element in the pipe joint in the pipeline; and inserting the vortex suppression element in the located pipe joint in the pipeline.

16 Claims, 9 Drawing Sheets

(51) Int. Cl.
*F15D 1/02* (2006.01)
*F15D 1/06* (2006.01)
*F16L 57/06* (2006.01)

(58) Field of Classification Search
CPC .... F15D 1/02; F15D 1/025; F15D 1/06; F16L 57/06
See application file for complete search history.

(56) References Cited

U.S. PATENT DOCUMENTS

| | | | |
|---|---|---|---|
| 4,080,997 A | 3/1978 | Biornstad | |
| 4,784,183 A | 11/1988 | Moore | |
| 5,992,465 A * | 11/1999 | Jansen | F16L 55/00 138/37 |
| 6,101,885 A * | 8/2000 | Touzin | G01F 1/3209 73/861.22 |
| 6,899,172 B2 | 5/2005 | McLeod | E21B 33/068 166/90.1 |
| 7,090,153 B2 * | 8/2006 | King | B05B 1/20 239/553 |
| 7,107,662 B1 | 9/2006 | Levario | |
| 7,213,641 B2 * | 5/2007 | McGuire | E21B 33/068 166/177.5 |
| 7,445,247 B2 * | 11/2008 | Ericksen | F16L 37/008 285/104 |
| 7,780,408 B2 | 8/2010 | Lazzarato et al. | |
| 7,992,635 B2 * | 8/2011 | Cherewyk | E21B 43/26 166/75.15 |
| 8,220,496 B2 * | 7/2012 | Marica | F04D 29/466 138/37 |
| 8,770,277 B2 * | 7/2014 | Artherholt | E21B 43/26 166/177.5 |
| 8,839,821 B2 | 9/2014 | Pinkerton | |
| 10,260,537 B2 * | 4/2019 | Sawchuk | G01F 15/00 |
| 2005/0076668 A1 * | 4/2005 | Choi | B60H 1/00564 62/404 |
| 2009/0065431 A1 * | 3/2009 | Bakke | B01D 17/0217 210/512.1 |
| 2010/0263872 A1 | 10/2010 | Bull et al. | |

OTHER PUBLICATIONS

Murphy, Brady; Emerging Trends & Technologies for Unconventionals, Halliburton, Solving Challenges, U.S. China Oil & Gas Industries Forum 14, Denver, Colorado, Sep. 24-26, 2014, 31 pages, uschinaogf.org, U.S. Department of Energy, Washington, DC.
International Search Report and Written Opinion; PCT Application No. PCT/US2015/040778; dated Apr. 15, 2016.

* cited by examiner

PARTICULATE LADEN FLUID VORTEX EROSION MITIGATION

CROSS-REFERENCE TO RELATED APPLICATIONS

This application is a national stage entry of PCT/US2015/040778 filed Jul. 16, 2015, said application is expressly incorporated herein in its entirety.

FIELD

The subject matter herein generally relates to the transport of particle laden fluid through pipes.

BACKGROUND

The transport of particle laden fluid through pipes at high pressures and high flow rates has become a common occurrence during hydraulic fracturing of subterranean hydrocarbon containing formations penetrated by well bores. Typically a fracturing fluid such as a gelled aqueous fluid is pumped into the formation at a rate and pressure such that fractures are created and extended therein. A propping material such as sand is typically deposited in the fractures so that they are prevented from completely closing to provide flow passages through which hydrocarbons readily flow to the well bore.

Presently there is commercially available equipment transportable via truck to a remote well site for rapid on-site assembly and connection to an on-site water source for the production of fracturing fluid and injection of the fracturing fluid into a well head. The equipment may produce and inject the fracturing fluid into the well head at a pressure up to 10,000 psi (69,000 kPa) and a flow rate up to 100 barrels per minute (bpm) thorough pipe having a nominal internal diameter of seven inches (15.8 cm).

DETAILED DESCRIPTION

Figure 1:
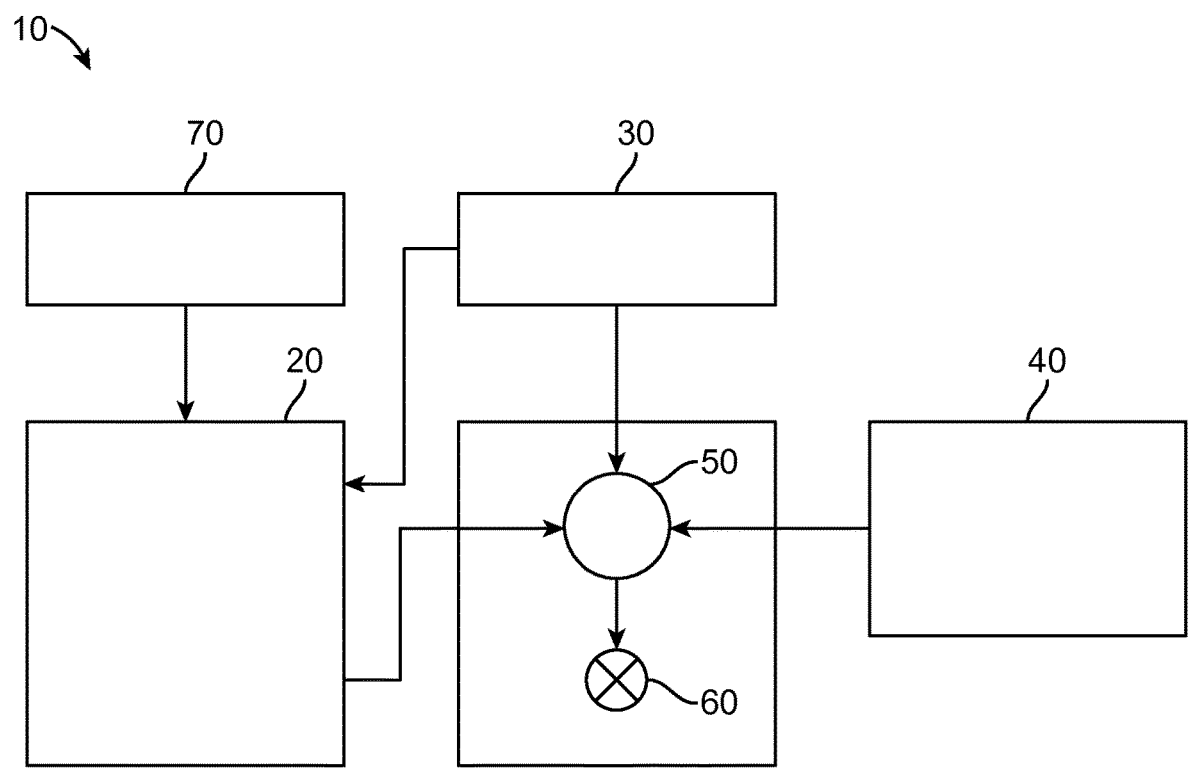
FIG. 1 is a diagram illustrating an example of a fracturing system that may be used in accordance with certain embodiments of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object.

Wells in certain geographic locations such as in shale formations may require an initial fracturing to be economically productive. Wells that have been initially fractured are often successfully restimulated by refracturing. The initial fracturing and the refracturing involve injection of fracturing fluid into the well bore. In most cases, the fracturing fluids include particulate proppant material sized to enter into and prop open fractures created in the subterranean formation surrounding the well bore by injecting the fracturing fluid under pressure into the well bore. For example, 100 mesh sand, 40/70 and 30/50 sieve sizes, is commonly used as proppant material.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50, and the system 10 resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In some instances, the fracturing fluid may comprise water, a hydrocarbon fluid, a polymer gel, foam, air, wet gases and/or other fluids.

The proppant source 40 can include a proppant for combination with the fracturing fluid. The system 10 may also include additive source 70 that provides one or more additives (e.g., gelling agents, weighting agents, self-degrading particulates, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, just additives at other times, and combinations of those components at yet other times.

Figure 2:
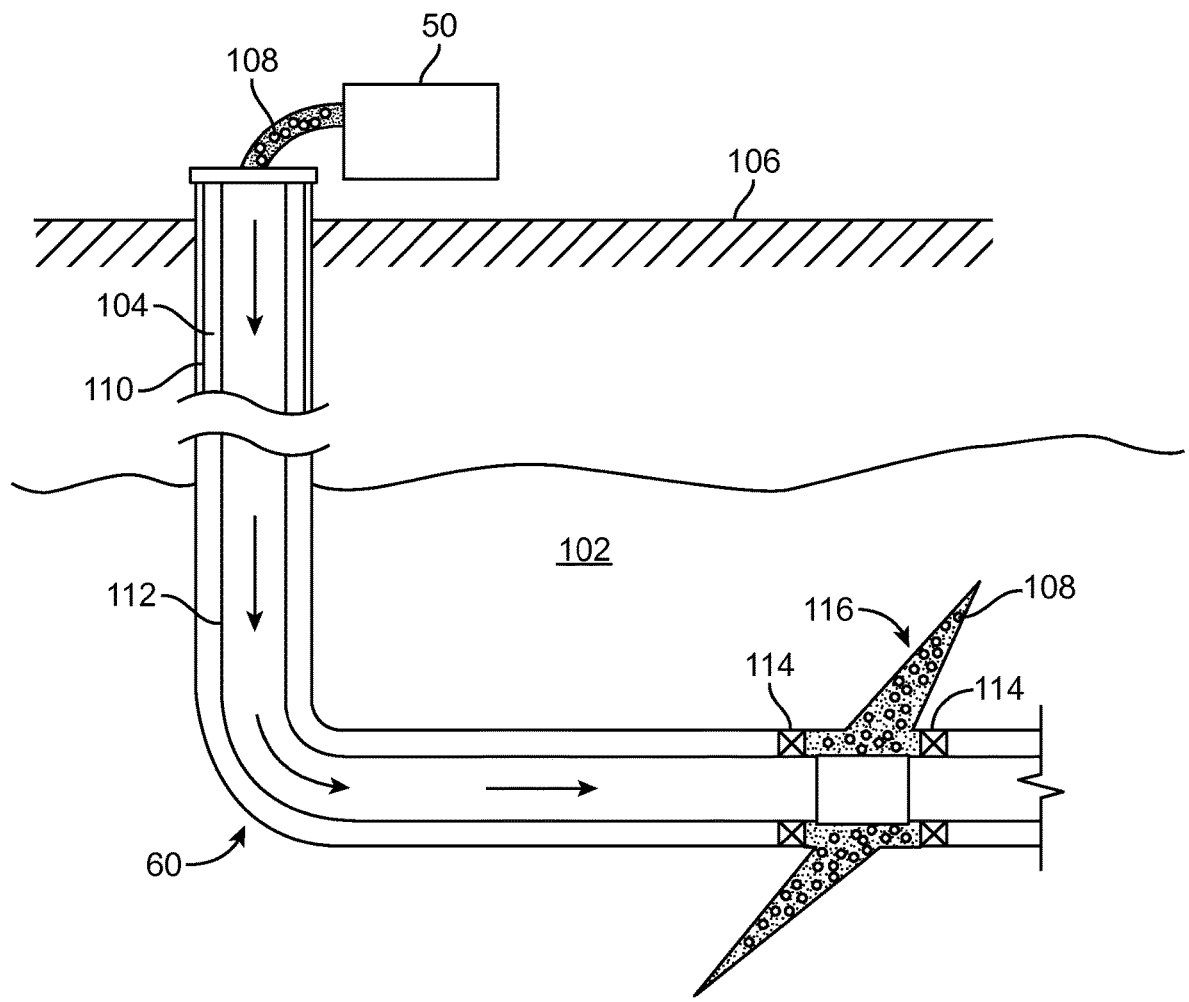
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating tool, hydro-jetting and/or other tools.

The well 60 is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Figure 3:
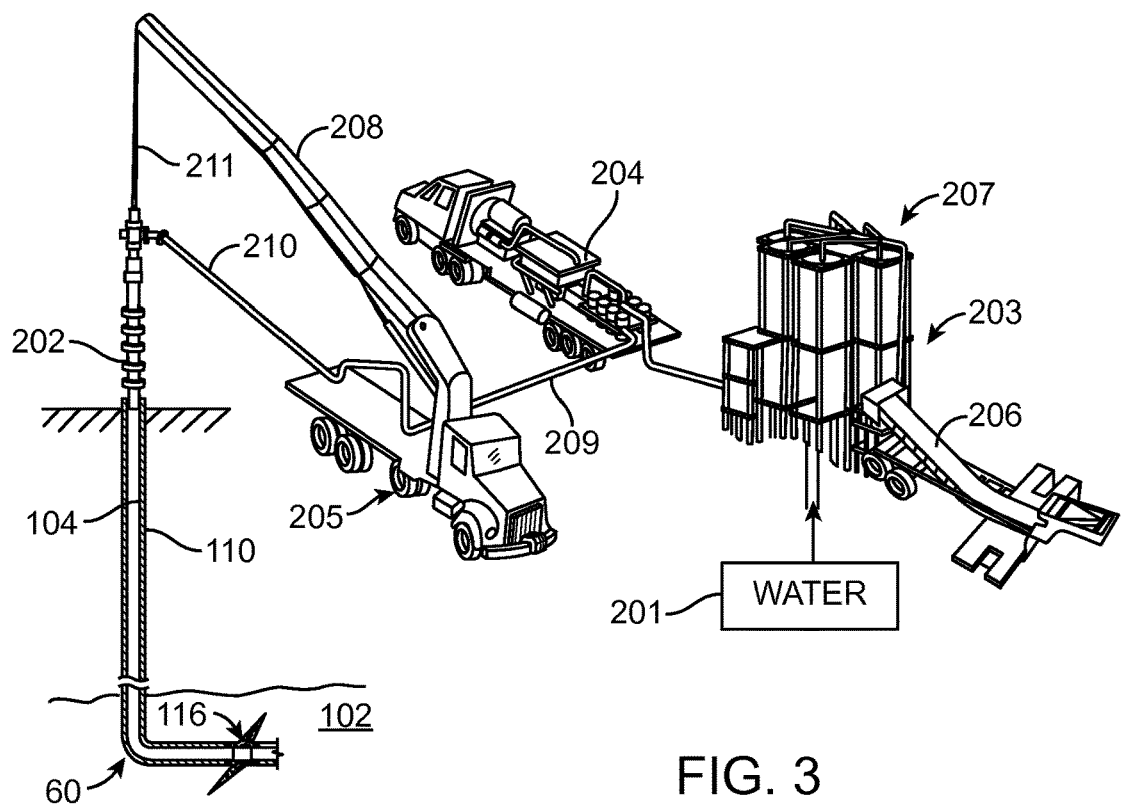
FIG. 3 is a pictorial diagram of equipment assembled at a well site for on-site production and injection of fracturing fluid into a well head.

As shown in FIG. 3, equipment has been transported via truck to a remote well site for rapid on-site assembly and connection to an on-site water source 201 for the production of fracturing fluid and injection of the fracturing fluid into a well head 202. In this example, the equipment includes a proppant management system 203, a pumping unit 204, and a well head connection unit 205. In other examples, the equipment may include more than one pumping unit for increasing the flow rate, and additional units such as one or more polymer blenders for adding polymer gel to the fracturing fluid. The equipment may produce and inject the fracturing fluid into the well head at a pressure up to 10,000 psi (69,000 kPa) and a flow rate up to 100 barrels per minute (bpm) thorough pipe having a nominal internal diameter of seven inches (15.8 cm).

The proppant management system 203 has a conveyor belt 206 for receiving proppant dumped onto the conveyor belt, and for conveying the proppant into hoppers 207. The proppant management system 203 may then selectively feed the proppant into a flow of water from the water source 201 to produce fracturing fluid. The pumping unit 204 pumps the fracturing fluid from the proppant management system 203 to the well head connection unit 205.

The well head connection unit 205 is comprised of a flat-bed truck 208 configured as a crane having a telescoping box boom 208. The flat-bed truck also carries an articulated pipeline including an inlet pipe segment 209 and an outlet pipe segment 210. The distal end of the boom 208 supports a load line 211 that can be connected to the distal end of the inlet pipe segment 208 to elevate, translate, and lower the distal end of the inlet pipe segment 208 onto an outlet pipe connector of the pumping unit 204. As shown in FIG. 3, the load line 211 is connected to the distal end of the outlet pipe segment 210, and has been used to elevate, translate, and lower the distal end of the outlet pipe segment onto the well head 202.

Figure 4:
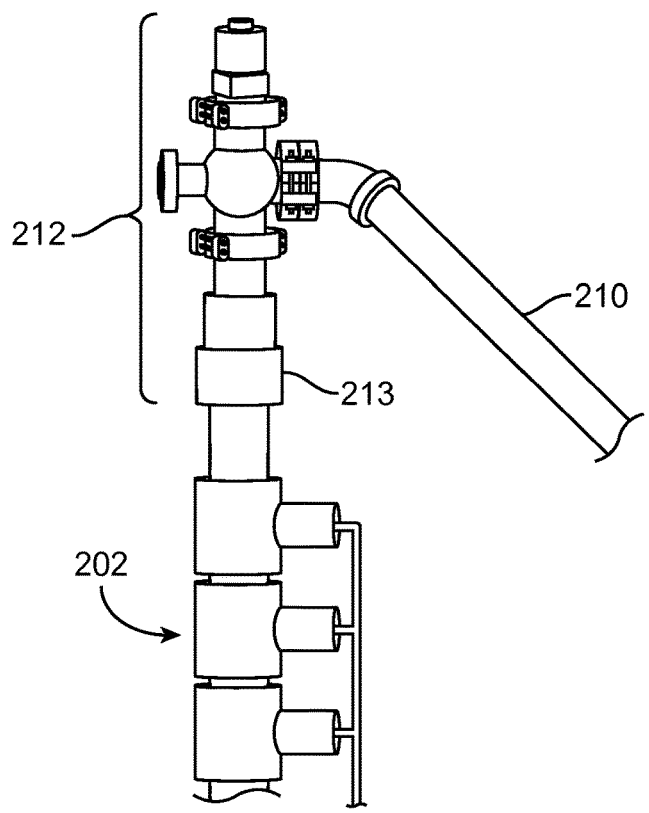
FIG. 4 is a pictorial diagram of a hub transition assembly of a Wellhead Connection Unit (WCU) mounted on the well head of FIG. 3.

FIG. 4 shows details of the connection of the distal end of the outlet pipe segment 110 to the well head 202. The distal end of the outlet pipe segment 110 carries a hub transition assembly 212. The bottom of the hub transition assembly 212 is the female part of a collet pipe connector 213 permitting rapid connection and disconnection of the hub transition assembly 212 from a hub that is the male part of the collet pipe connector 213 at the top of the well head 202. Once the collet pipe connection has been made, fracturing fluid under high pressure may flow from the outlet pipe segment 210 of the well head connection unit (205 in FIG. 1) into the hub transition assembly 212, and down through the hub transition assembly 210 and down through the well head 202 and into the subterranean well bore.

Figure 5:
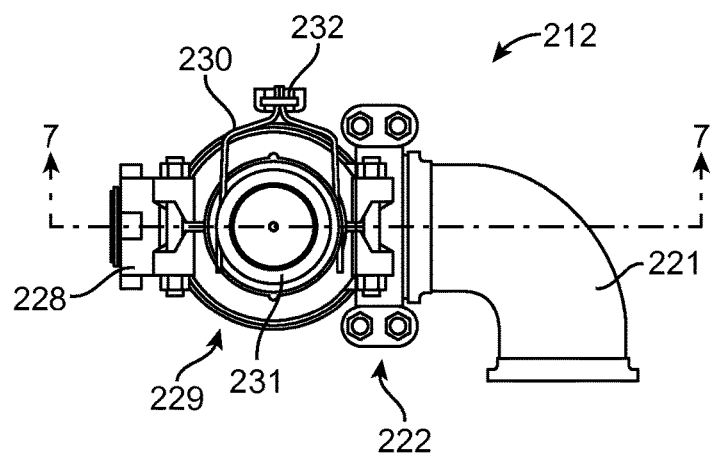
FIG. 5 is a top view of the hub transition assembly.
Figure 6:
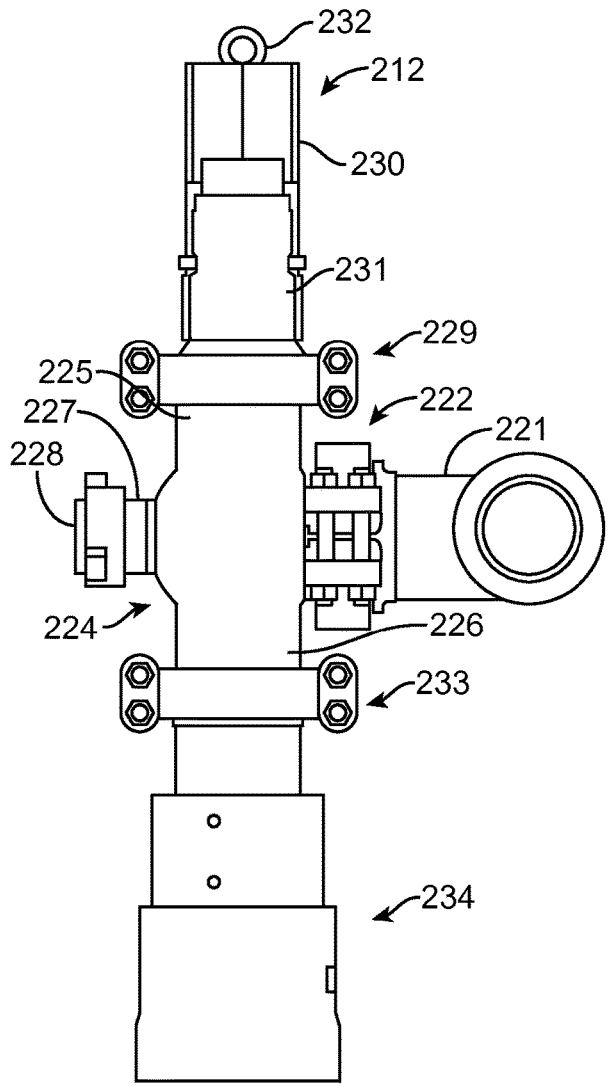
FIG. 6 is a side view of the hub transition assembly.
Figure 7:
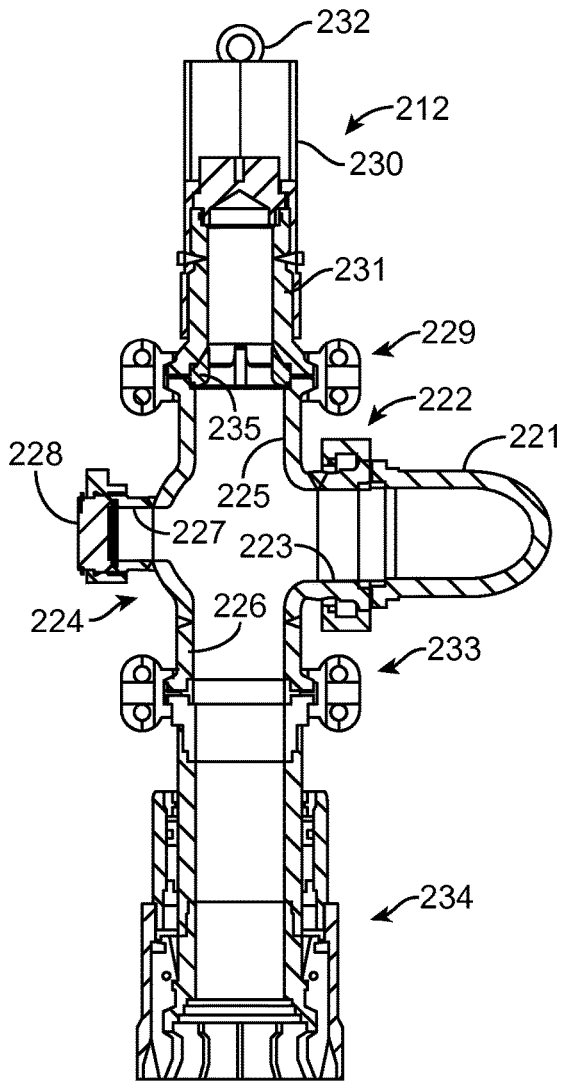
FIG. 7 is a lateral section view of the hub transition assembly along section line 7-7 in FIG. 5.
Figure 8:
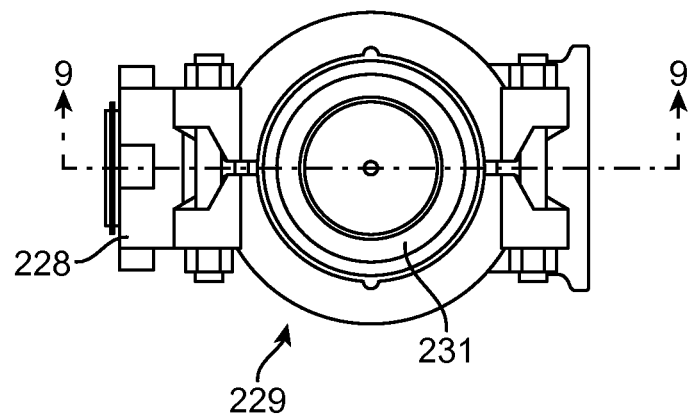
FIG. 8 is a top view of a hub adapter and cross-connector sub-assembly of the hub transition assembly.

FIGS. 5, 6, and 7 show details of the hub transition assembly 212. The hub transition assembly 212 has a 90 degree elbow 221 for connecting the hub transition assembly to the outlet pipe segment (210 in FIGS. 3 and 4) of the well head connection unit (205 in FIG. 3). A clamp 222 connects the elbow 221 to a first side port (223 in FIG. 7) of a multi-port pipe connector 224 of the hub transition assembly 212. The multi-port pipe connector 224 has a top port 225, a bottom port 226, and a second side port 227. The second side port 227 is opposite from the first side port to provide an access port for access to the first side port and into the elbow 221. Normally the second side port 227 is closed by a cap 228 that screws onto the second side port 227. A top clamp 229 connects a well access hub adapter (231 in FIG. 7) onto the top port 225 of the multi-port connector 224. A lifting bracket 230 secures an eyelet 232 to the hub adapter 231. The eyelet 232 provides an attachment point for the load line (211 in FIG. 3). The top port 225 and the hub adapter 231 can be used to enable a wire-line tool to access the well bore through the top port. A bottom clamp 233 connects the female part 234 of the collet connector (213 in FIG. 4) to the bottom port 226 of the multi-port connector 224.

For example, the elbow 331, first side port 223, top port 225, bottom port 226, and collet connector 213 have a nominal internal diameter of seven inches (15.8 mm), the second side port has a nominal internal diameter of four inches (10.1 mm), and the hub adapter 231 provides a transition from an internal diameter of five inches (10.6 mm) to an internal diameter of seven inches (15.8 mm). The multi-port connector 224 has a spherical central region having an internal diameter of twelve inches (30.5 mm). The multi-port connector 224 could be considered a kind of seven inch "T" connector, or a kind of cross-connector.

Figure 9:
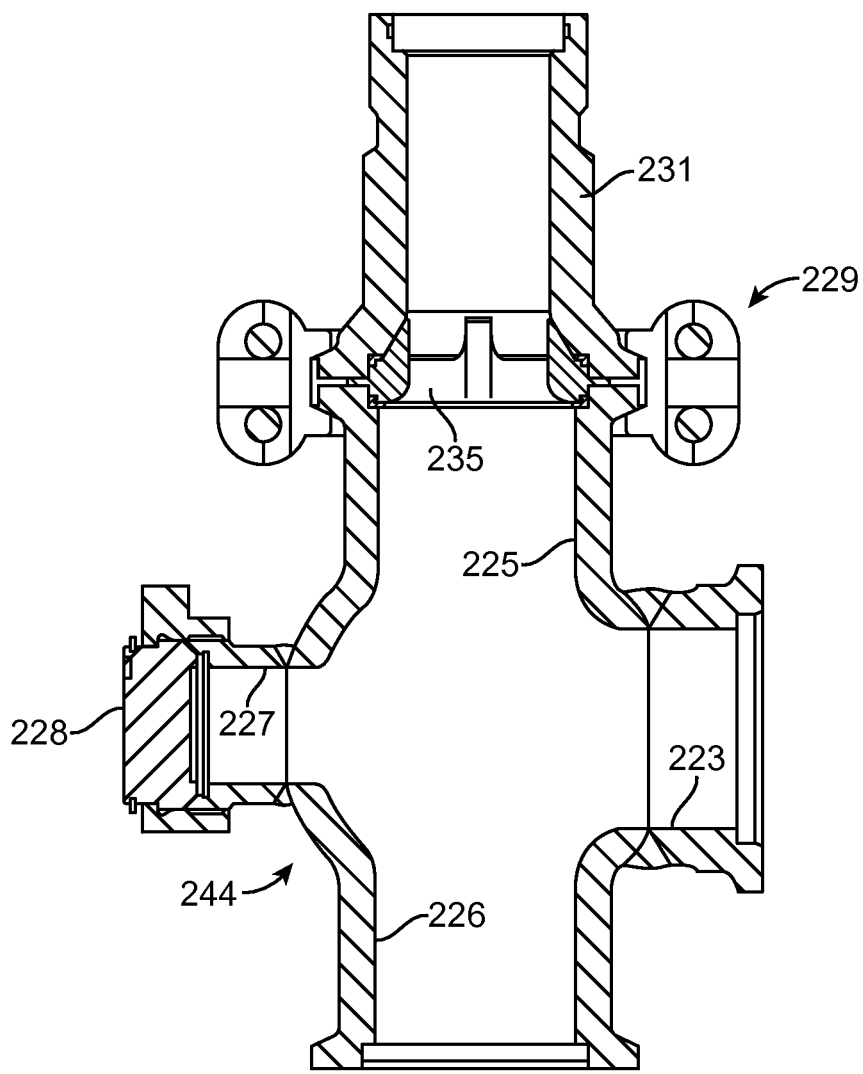
FIG. 9 is a side cross-section view of the hub adapter and cross-connector sub-assembly along section line 9-9 in FIG. 8.
Figure 10:
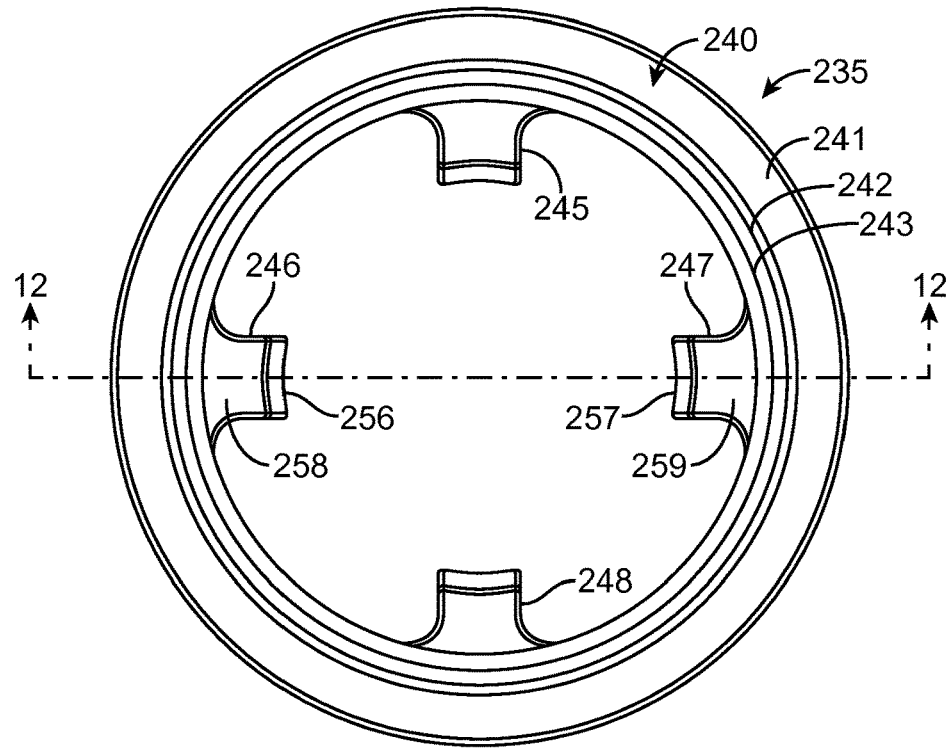
FIG. 10 is a top view of a vortex suppression element introduced in FIG. 9.
Figure 11:
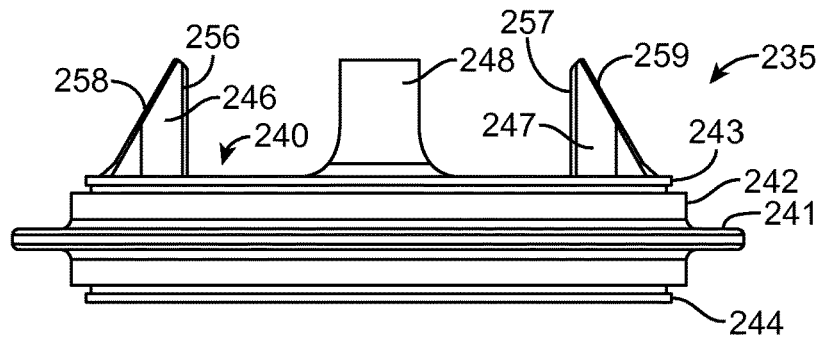
FIG. 11 is a side view of the vortex suppression element.
Figure 12:
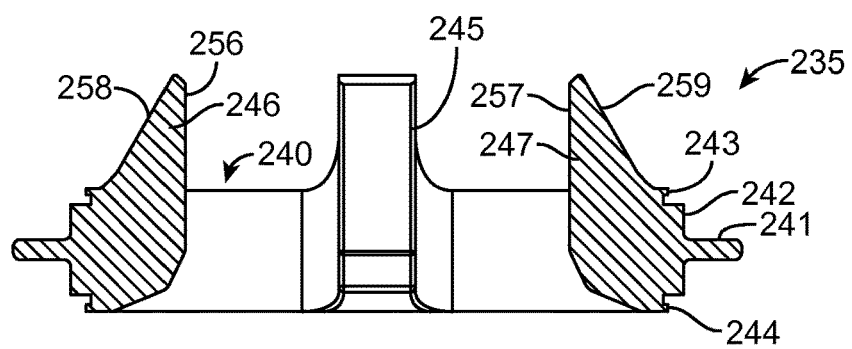
FIG. 12 is a cross-section view of the vortex suppression element along section line 12-12 in FIG. 10.
Figure 13:
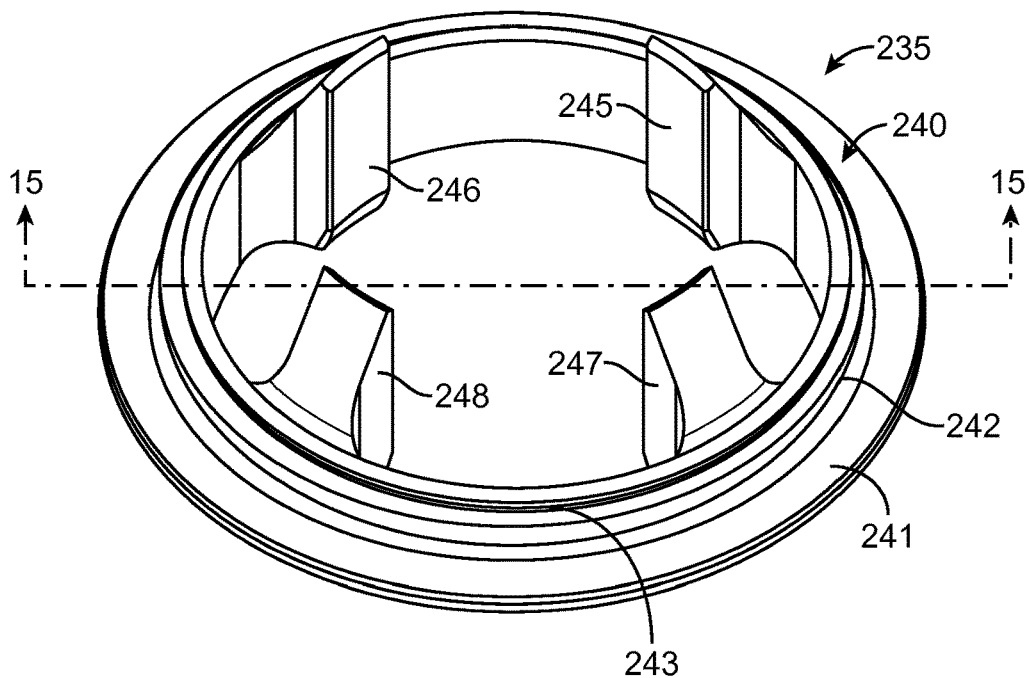
FIG. 13 is an oblique view of the vortex suppression element.
Figure 14:
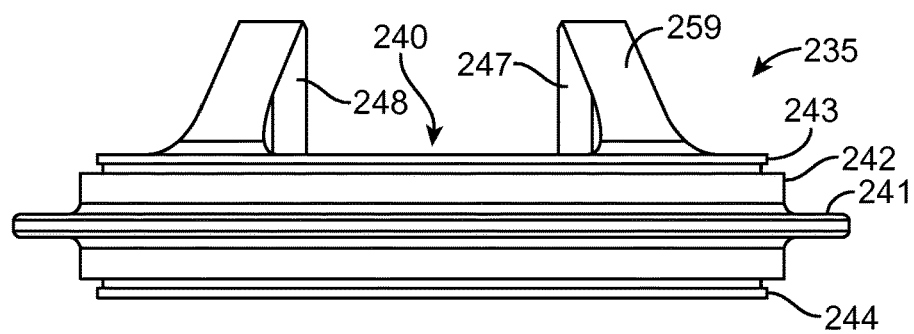
FIG. 14 is another side view of the vortex suppression element.
Figure 15:
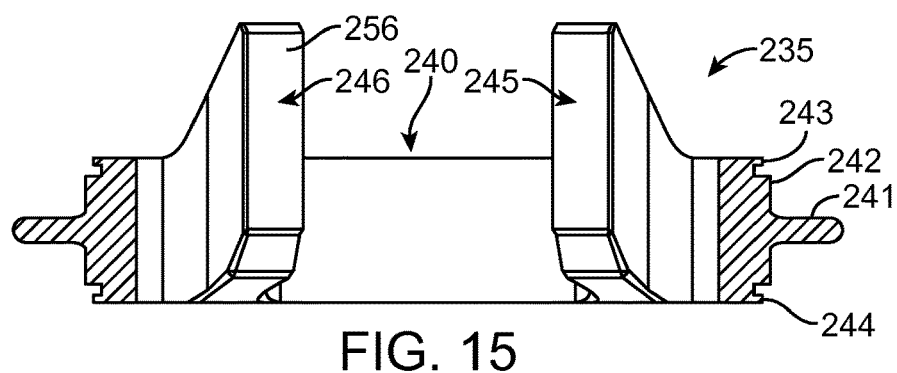
FIG. 15 is a cross-section view of the vortex suppression element along section line 15-15 in FIG. 13.

In operation, fracturing fluid flows into the first side port 223 from the elbow 221, and then down through the bottom port 226 to the female part 234 of the collet connector (213 in FIG. 4). When a flow rate of about 96 barrels per minute (bbm) has been used in the seven inch internal diameter piping, a vortex has been produced in the central region of the multi-port connector 224. This vortex has caused a high rate of wear upon the internal wall of the hub adapter 231 and multi-port connector 224 due to abrasion of proppant against the internal wall. It has been discovered that this vortex can be suppressed by interposing a vortex suppression element (235 in FIG. 7 and FIG. 9) in the pipe joint between the hub adapter 231 and the top port 225 of the multi-port connector 224. The vortex suppression element 235 can suppress the formation of a vortex despite the fact that there is no net axial flow of fracturing fluid through the top port 225. Also, the vortex suppression element 235 can have an internal clearance no less than the five inch internal diameter of the hub adapter 231 so as not to interfere with the passage of wireline tools through the hub adapter.

FIGS. 10 to 15 show various views of the vortex suppression element 235. The vortex suppression element 235 includes an outer ring 240 and an array of inner axial vanes 245, 246, 247, 248 secured to the outer ring. For example, as shown, the axial vanes 245, 246, 247, 248 are secured to an inner circumference of the outer ring and extend radially inward from the inner circumference of the outer ring. Neighboring ones of the inner axial vanes 245, 246, 247, 248 are spaced by an angular increment around an inner circumference of the outer ring. For example, neighboring ones of the four axial vanes 245, 246, 247, 248 in FIGS. 10 to 15 are spaced at a 90 degree increment around the inner circumference of the outer ring 245. In other configurations, the array may include a different number of axial vanes, such as five axial vanes spaced at 72 degree increments around the inner circumference of the outer ring, or six axial vanes spaced at 60 degree increments around the inner circumference of the outer ring. The array of inner axial vanes may have four to six inner axial vanes.

In the examples of FIGS. 10 to 15, the axial vanes 245, 246, 247, and 248 are integral with the outer ring 235. For example, the entire vortex suppression element 235 is machined from one steel sand casting. In other examples, the outer ring 235 could be one integral piece, and each axial vane could be another integral piece fastened to the outer ring 235. For example, the axial vanes could be welded to the outer ring 235.

In FIGS. 10 to 15, the axial vanes 245, 246, 247, 248 have upper ends protruding axially upward from the outer ring 245. For example, the axially protruding portion of each axial vane include an inner surface (e.g. 256, 257) extending axially, and an outer surface (e.g. 258, 259) extending at an acute angle with respect to the inner surface.

In other configurations of the vortex suppression element 235, the axial vanes could have lower ends protruding axially downward from the outer ring. In still other configurations, the axial vanes could have upper ends protruding axially upward from the outer ring, and also lower ends protruding axially downward from the outer ring.

In FIGS. 10 to 15, the outer ring 240 has a disk-shaped rim 241 extending radially outward from a tubular body 242. For example, as shown, the rim 241 is midway between an upper axial end and a lower axial end of the outer ring 242, although in other configurations the rim 241 could be closer either to the lower axial end or closer to the upper axial end of the outer ring 242.

In FIGS. 10 to 15, the upper axial end of the outer ring 242 is formed with an upper circumferential lip 243, and the lower axial end of the outer ring 242 is formed with a lower circumferential lip 244.

Figure 16:
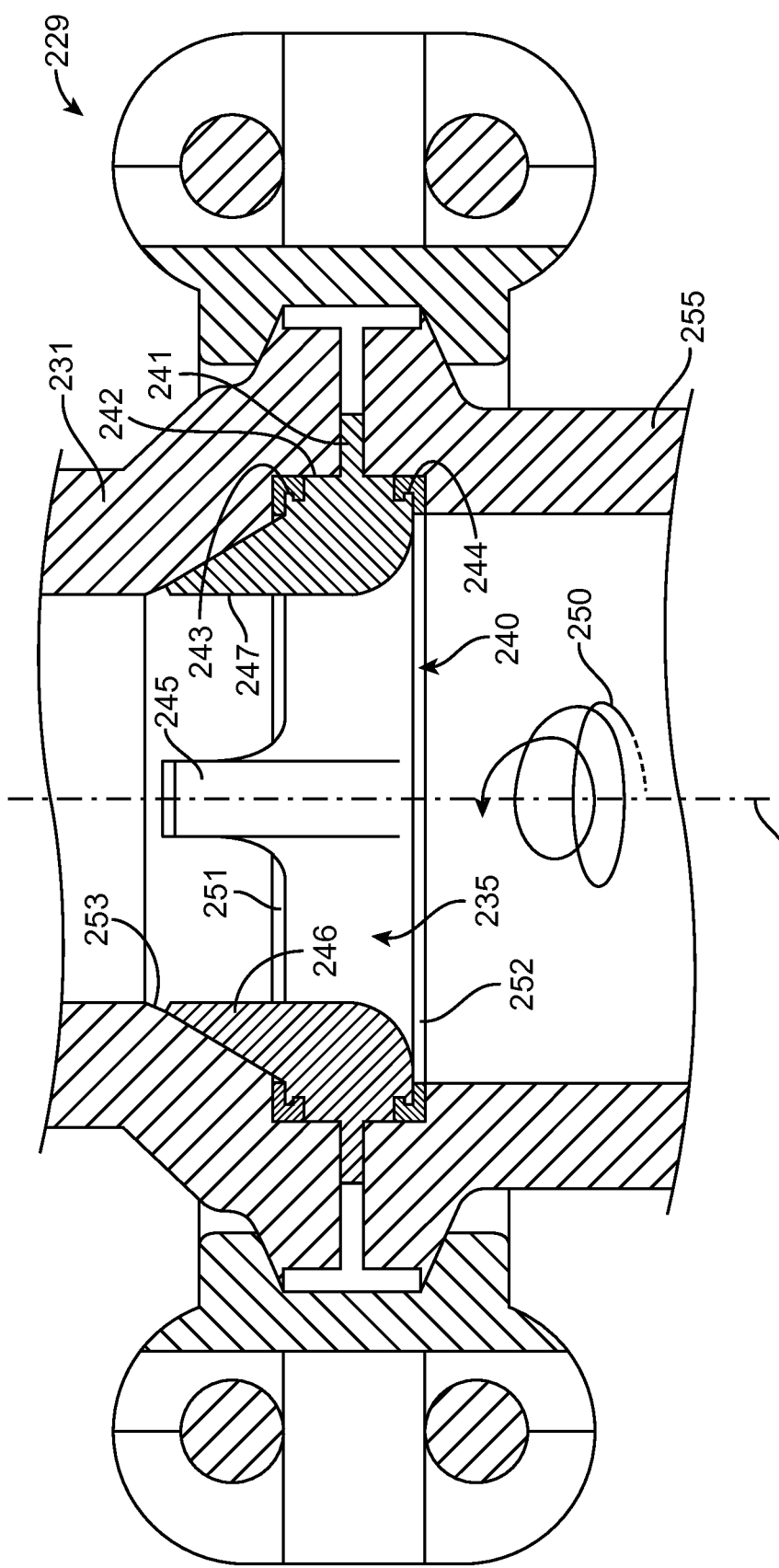
FIG. 16 is an enlarged view of the pipe joint containing the vortex suppression element as introduced in FIG. 9.

FIG. 16 shows that the features of the vortex suppression element 235 described above conform to first and second pipe segments when the vortex suppression ring is sandwiched between neighboring ends of the first and second pipe segments at a joint connecting the neighboring ends of the first and second pipe segments. In particular, FIG. 16 is an expanded view of the joint in FIG. 9 connecting the lower end of the hub adapter 231 (i.e., the first pipe segment) to the upper end of the upper port 255 (i.e., the second pipe segment) of the multi-port connector (244 in FIG. 9). The vortex suppression element 235 suppresses formation of a vortex 250 that may form around a central longitudinal axis 249 at high flow rates of the fracturing fluid, such as flow rates of 96 barrels per minute or more, in the absence of the vortex suppression element.

In FIG. 16, the clamp 229 clamps the disk-shaped rim 241 directly between the lower end of the hub adapter 231 and the upper end of the upper port 255. The clamp 229 also clamps an upper annual seal 251 between the lower end of the hub adapter 231 and the upper axial end of the outer ring 240, and clamps a lower annual seal 252 between the lower axial end of the outer ring 240 and the upper end of the upper port 255.

The upper circumferential lip 243 is engaged in an internal annular groove in the upper annular seal 251. Thus, the upper annular seal 251 may be fitted onto the upper axial end of the outer ring 240 so that the upper annular seal 251 is held in place by the upper circumferential lip 243, prior to joining of the lower end of the hub adapter 231 to the upper end of the upper port 255. In a similar fashion, the lower circumferential lip 244 is engaged in an internal annular groove in the lower annular seal 252. Thus, the lower annular seal 252 may be fitted onto the lower axial end of the outer ring 240 so that it is held in place by the lower circumferential lip 244, prior to joining of the lower end of the hub adapter 231 to the upper end of the upper port 255. The annular seals 251, 252, for example, are elastomeric seals for low pressure operation, or ductile metal seals for high pressure operation.

In FIG. 16, the axial vanes 245, 246, 247, 248 protrude axially upward to conform to an internal conical surface 253 of the hub adapter 231. This internal conical surface 253 provides a tapered transition from a smaller internal diameter of the upper part of the hub adapter 231 (e.g., five inches or 10.6 mm) to a larger internal diameter of the upper port 255 (e.g., seven inches or 15.8 cm). For example, the internal conical surface 253 has an acute angle of thirty degrees with respect to the central longitudinal axis 249. In this example, the axial vanes 245, 246, 247 extend radially inward from the inner circumference of the outer ring 240 up to but no further inward than the internal diameter of the upper part of the hub adapter 231 so that the axial vanes do not physically interfere with any down-hole tools introduced into the well bore through the hub adapter. The bottom axial ends of the axial vanes 245, 246, 247 are rounded so that when a wireline tool is raised from the well bore, the tool is guided from the larger internal diameter of the upper port 255 to the smaller internal diameter of the hub adapter 231.

Although the vortex suppression element 235 has been described with respect to the flow of fracturing fluid through a hub transition assembly of a well head connection unit, the vortex suppression element 235 may also be used for vortex suppression to mitigate erosion from other kinds of particulate laden fluid flowing through a pipeline. For example, the fluid could be ash and combustion gas products in a coal-fired power plant, or cement slurry in a facility for manufacturing cement blocks.

Figure 17:
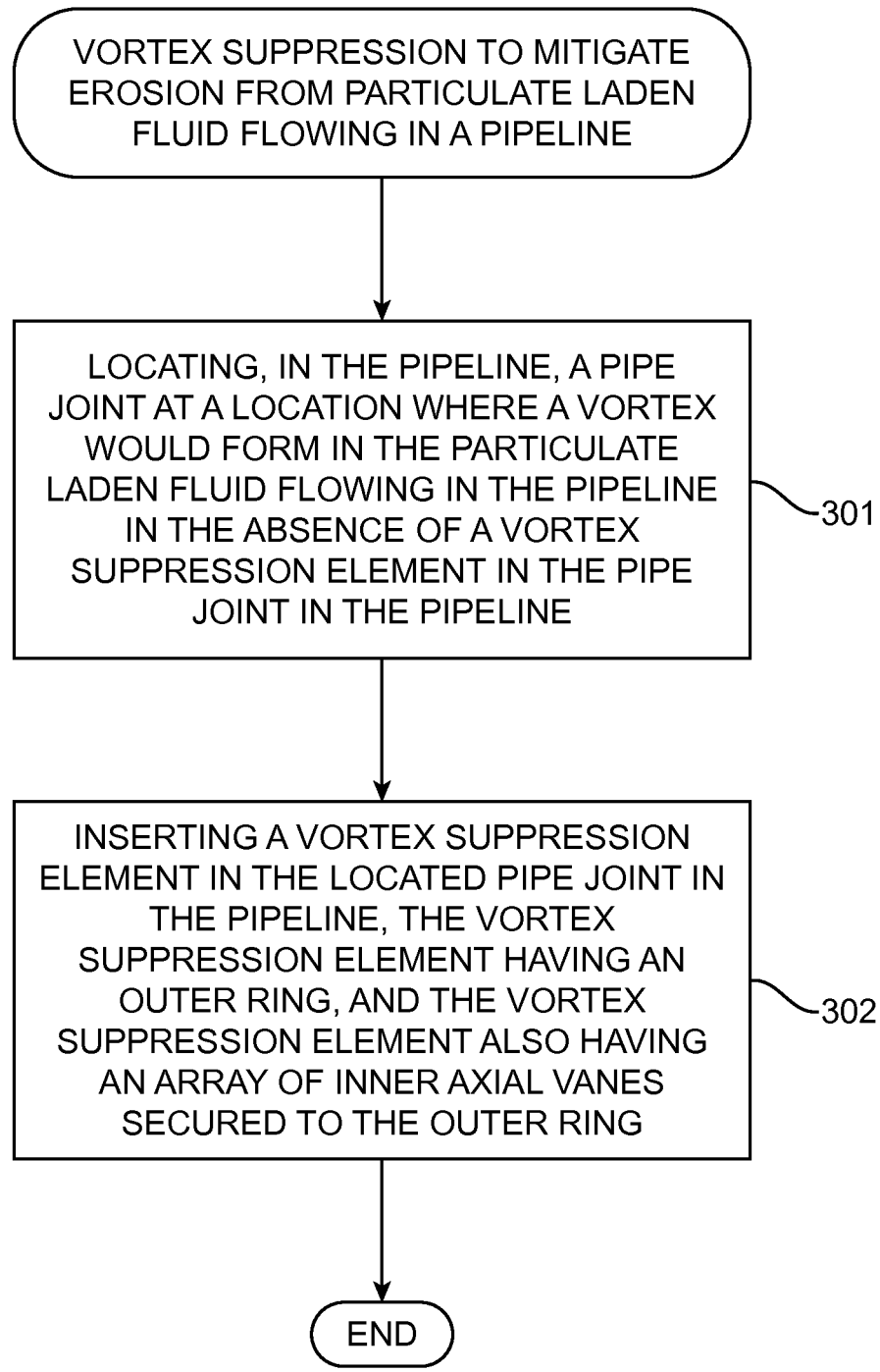
FIG. 17 is a flowchart showing a method of using the vortex suppression element.

FIG. 17 shows a general method of using the vortex suppression element to mitigate erosion from particulate laden fluid flowing in a pipeline. In a first box 301, the method includes locating, in the pipeline, a pipe joint at a location where a vortex would form in the particulate laden fluid flowing in the pipeline in the absence of a vortex suppression element in the pipe joint in the pipeline. For example, the location of such a pipe joint may be found by inspection of the internal surface of the pipeline for erosive wear. The inspection could be done by a video camera on a snake or pig run through the pipeline. If erosive wear is found, but such erosive wear is not found at the location of an existing pipe joint in the pipeline, then the pipeline could be cut at a location of the erosive wear and a pipe joint could be inserted at this location, for example by welding hubs to the ends of the pipeline at the location of the cut.

In a second box 302, the vortex suppression element 235 is inserted in the located pipe joint in the pipeline. The vortex suppression element 235 has an outer ring, and the vortex suppression element also has an array of inner axial vanes secured to the outer ring. For example, the vortex suppression element 235 and a pair of seals 251, 252 are clamped between the respective ends of the pipe segments of the located pipe joint.

Statements of the Disclosure Include:

Statement 1: An apparatus comprising: an outer ring; and an array of inner axial vanes secured to the outer ring.

Statement 2: The apparatus as in Statement 1, wherein the axial vanes are secured to an inner circumference of the outer ring and extend radially inward from the inner circumference of the outer ring.

Statement 3: The apparatus as in Statement 1 or 2, wherein the inner axial vanes are integral with the outer ring.

Statement 4: The apparatus according to any of the preceding Statements 1 to 3, wherein neighboring ones of the inner axial vanes are spaced by an angular increment around an inner circumference of the outer ring.

Statement 5: The apparatus according to any of the preceding Statements 1 to 4, wherein the array of inner axial vanes has four to six inner axial vanes.

Statement 6: The apparatus according to any of the preceding Statements 1 to 5, wherein the axial vanes protrude axially from the outer ring.

Statement 7: The apparatus according to any of the preceding Statements 1 to 6, wherein an axial protruding portion of each axial vane includes an inner surface extending axially and an outer surface extending at an acute angle with respect to the inner surface.

Statement 8: The apparatus according to any of the preceding Statements 1 to 7, wherein the outer ring has a tubular body and a disk-shaped rim extending radially outward from the tubular body.

Statement 9: The apparatus according to any of the preceding Statements 1 to 8, further comprising a pipe joint including a first pipe segment and a second pipe segment joined to the first pipe segment, and the disk-shaped rim is clamped in the pipe joint between an end of the first pipe segment and an end of the second pipe segment.

Statement 10: The apparatus according to any of the preceding Statements 1 to 9, wherein the outer ring has a first axial end and a first circumferential lip on the first axial end, and the outer ring has a second axial end and a second circumferential lip on the second axial end.

Statement 11: The apparatus according to any of the preceding Statements 1 to 10, further comprising a first annular seal engaging the first axial end of the outer ring and held to the first axial end of the outer ring by the first circumferential lip, and further comprising a second annular seal engaging the second axial end of the outer ring and held to the second axial end of the outer ring by the second circumferential lip.

Statement 12: The apparatus according to any of the preceding Statements 1 to 11, further comprising a pipe joint including a first pipe segment and a second pipe segment joined to the first pipe segment, and the outer ring is clamped in the pipe joint between an end of the first pipe segment and an end of the second pipe segment.

Statement 13: The apparatus according to the preceding Statement 12, wherein the second pipe segment is a first port of multi-port pipe connector.

Statement 14: The apparatus according to the preceding Statement 13, wherein the first pipe segment is a hub adapter for providing access to a well head of a subterranean well bore, and the first port is a top port of the multi-port pipe connector, and the multi-port pipe connector has a side port for inflow of fracturing fluid from a pump, and the multi-port pipe connector has a bottom port for outflow of the fracturing fluid to the well head.

Statement 15: The apparatus according to any of the preceding Statements 12 to 14, further comprising a first annular seal clamped between an end of the first pipe segment and a first axial end of the outer ring, and a second annular seal clamped between a second annular end of the outer ring and an end of the second pipe segment.

Statement 16: The apparatus according to any of the preceding Statements 12 to 15, wherein the first pipe segment has an internal diameter less than an internal diameter of the second pipe segment, and the axial vanes protrude radially inward from an inner circumference of the outer ring to the internal diameter of the first pipe segment.

Statement 17: The apparatus according to the preceding Statement 16, wherein the first pipe segment has a tapered transition from the end of the first pipe segment to the internal diameter of the first pipe segment, and the axial vanes conform to the tapered transition and protrude axially into the tapered transition.

Statement 18: The apparatus according to the preceding Statements 16 or 17, wherein the axial vanes protrude radially inward no further than the inner diameter of the first pipe segment.

Statement 19: A method of vortex suppression to mitigate erosion from particulate laden fluid flowing in a pipeline, the method comprising: (a) locating, in the pipeline, a pipe joint at a location where a vortex would form in the particulate laden fluid flowing in the pipeline in the absence of a vortex suppression element in the pipe joint in the pipeline; and (b) inserting, in the located pipe joint in the pipeline, a vortex suppression element in accordance with any of the preceding examples first to eighteenth.

Statement 20: The method according to statement 19, wherein the particulate laden fluid is fracturing fluid, the pipeline conveys the fracturing fluid from a pump to a well head of a subterranean well bore, the located pipe joint is a joint between a well access hub adapter and a top port of a multi-port pipe connector, and the multi-port pipe connector also has a side port for inflow of the fracturing fluid from the pump, and the multi-port pipe connector also has a bottom port for outflow of the fracturing fluid to the well head.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:
1. An apparatus comprising:
(a) an outer ring with a first axial end and a first circumferential lip on the first axial end and a second axial end and a second circumferential lip on the second axial end;
(b) an array of inner axial vanes secured to the outer ring, the inner axial vanes protruding axially from the outer ring, each axial vane including an inner surface extending axially and an outer surface extending at an acute angle with respect to the inner surface; and (c)
a first annular seal engaging the first axial end of the outer ring and held to the first axial end of the outer ring by the first circumferential lip, and a second annular seal engaging the second axial end of the outer ring and held to the second axial end of the outer ring by the second circumferential lip.

2. The apparatus as claimed in claim 1, wherein the axial vanes are secured to an inner circumference of the outer ring and extend radially inward from the inner circumference of the outer ring.

3. The apparatus as claimed in claim 1, wherein the inner axial vanes are integral with the outer ring.

4. The apparatus as claimed in claim 1, wherein neighboring ones of the inner axial vanes are spaced by an angular increment around an inner circumference of the outer ring.

5. The apparatus as claimed in claim 1, wherein the array of inner axial vanes has four to six inner axial vanes.

6. The apparatus as claimed in claim 1, wherein the outer ring has a tubular body and a disk-shaped rim extending radially outward from the tubular body.

7. The apparatus as claimed in claim 6, further comprising a pipe joint including a first pipe segment and a second pipe segment joined to the first pipe segment, and the disk-shaped rim is clamped in the pipe joint between an end of the first pipe segment and an end of the second pipe segment.

8. The apparatus as claimed in claim 1, further comprising a pipe joint including a first pipe segment and a second pipe segment joined to the first pipe segment, and the outer ring is clamped in the pipe joint between an end of the first pipe segment and an end of the second pipe segment.

9. The apparatus as claimed in claim 8, wherein the second pipe segment is a first port of a multi-port pipe connector.

10. The apparatus as claimed in claim 9, wherein the first pipe segment is a hub adapter for providing access to a well head of a subterranean well bore, and the first port is a top port of the multi-port pipe connector, and the multi-port pipe connector has a side port for inflow of fracturing fluid from a pump, and the multi-port pipe connector has a bottom port for outflow of the fracturing fluid to the well head.

11. The apparatus as claimed in claim 8, further comprising the first annular seal clamped between an end of the first pipe segment and the first axial end of the outer ring, and the second annular seal clamped between the second axial end of the outer ring and an end of the second pipe segment.

12. The apparatus as claimed in claim 8, wherein the first pipe segment has an internal diameter less than an internal diameter of the second pipe segment, and the axial vanes protrude radially inward from an inner circumference of the outer ring to the internal diameter of the first pipe segment.

13. The apparatus as claimed in claim 12, wherein the first pipe segment has a tapered transition from the end of the first pipe segment to the internal diameter of the first pipe segment, and the axial vanes conform to the tapered transition and protrude axially into the tapered transition.

14. The apparatus as claimed in claim 12, wherein the axial vanes protrude radially inward no further than the inner diameter of the first pipe segment.

15. A method of vortex suppression to mitigate erosion from particulate laden fluid flowing in a pipeline, the method comprising:
(a) locating, in the pipeline, a pipe joint at a location where a vortex would form in the particulate laden fluid flowing in the pipeline in the absence of a vortex suppression element in the pipe joint in the pipeline; and (b) inserting a vortex suppression element in the located pipe joint in the pipeline, the vortex suppression element having an outer ring with a first axial end and a first circumferential lip on the first axial end and a second axial end and a second circumferential lip on the second axial end, an array of inner axial vanes secured to the outer ring, the inner axial vanes protruding axially from the outer ring, each axial vane including an inner surface extending axially and an outer surface extending at an acute angle with respect to the inner surface, and the vortex suppression element also having a first annular seal engaging the first axial end of the outer ring and held to the first axial end of the outer ring by the first circumferential lip, and a second annular seal engaging the second axial end of the outer ring and held to the second axial end of the outer ring by the second circumferential lip.

16. The method as claimed in claim 15, wherein the particulate laden fluid is fracturing fluid, the pipeline conveys the fracturing fluid from a pump to a well head of a subterranean well bore, the located pipe joint is a joint between a well access hub adapter and a top port of a multi-port pipe connector, and the multi-port pipe connector also has a side port for inflow of the fracturing fluid from the pump, and the multi-port pipe connector also has a bottom port for outflow of the fracturing fluid to the well head.

* * * * *